P. F. HABERSTICK.
AUTOMOBILE ACCESSORY.
APPLICATION FILED AUG. 14, 1914.
1,144,540.
Patented June 29, 1915.
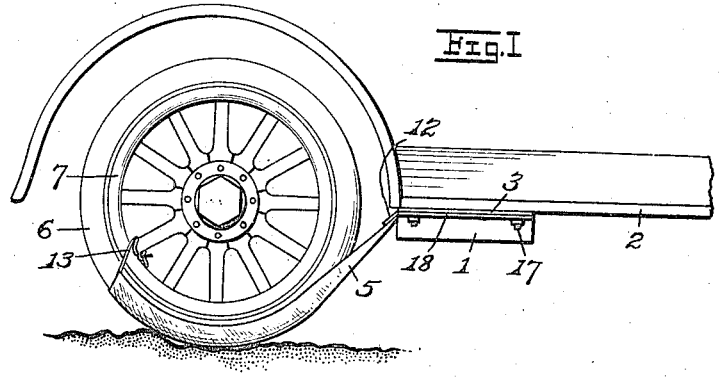
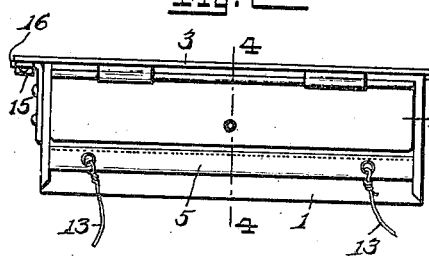
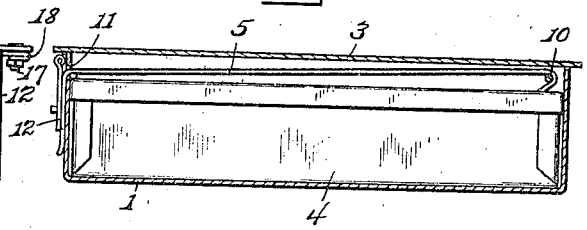
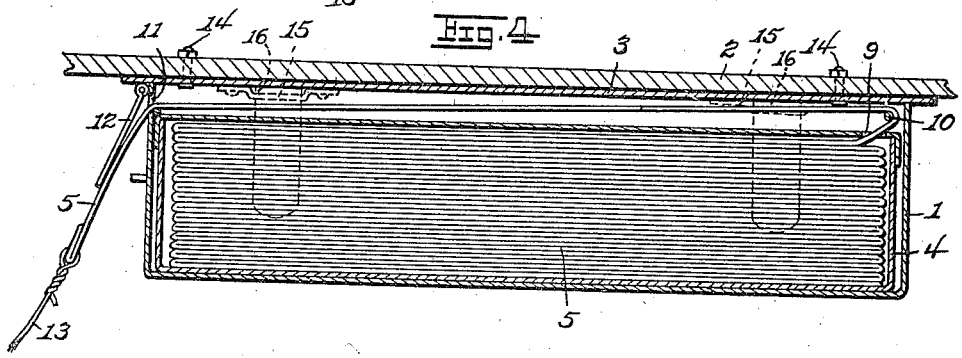
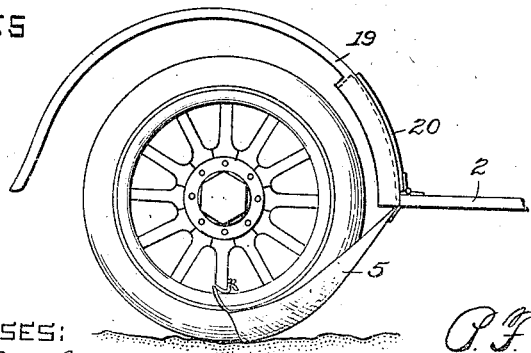
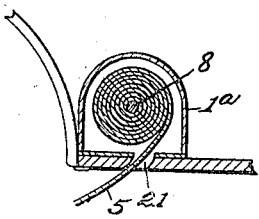
WITNESSES:
F. E. Arthur
W. F. Keefer
INVENTOR—
P. F. Haberstick
BY
N. E. Dunlap
ATTORNEY.

UNITED STATES PATENT OFFICE.

PETER F. HABERSTICK, OF WHEELING, WEST VIRGINIA.

AUTOMOBILE ACCESSORY.

1,144,540.

Specification of Letters Patent.

Patented June 29, 1915.

Application filed August 14, 1914. Serial No. 856,816.

*To all whom it may concern:*

Be it known that I, PETER F. HABERSTICK, a citizen of the United States of America, and resident of Wheeling, county of Ohio, and State of West Virginia, have invented certain new and useful Improvements in Automobile Accessories, of which the following is a specification.

This invention relates broadly to automobile accessories, and more specifically to a device for assisting traction for such vehicles.

The primary object of the invention is to provide an emergency device whereby positive traction may be afforded the rear wheels of a motor vehicle for assisting the same out of mud holes or other places where insufficient frictional resistance is offered the traction wheels to enable the vehicle to advance.

A further object is to provide a device of simple and inexpensive construction which may be quickly and easily applied when occasion requires to enable the traction wheels of a vehicle to pull out of ruts, mud holes and the like.

With these and other objects in view, the invention resides in the features of construction, arrangement of parts and combinations of elements which will hereinafter be fully described, reference being had to the accompanying drawings, forming a part of this specification, in which—

Figure 1 is a side elevation of the invention in working position applied to an automobile; Fig. 2 is an enlarged end elevation of the invention; Fig. 3 is a partial longitudinal section of the same; Fig. 4 is a central longitudinal section still further enlarged; Fig. 5 is a view similar to Fig. 1 showing the invention having a built-in form designed for use on new cars; and Fig. 6 is a sectional view of a modified form.

Referring to said drawings, in which like designating characters distinguish like parts throughout the several views, 1 indicates a substantially rectangular casing, preferably formed of sheet metal, designed for attachment either to the top or under surface of the running board 2 of an automobile, said casing being provided with a removable cover 3. Fitted within said casing is a suitable container, as a paste-board box or carton 4, within which is folded a long strip of strong tape 5, preferably of canvas, fiber paper, or other suitable fabric or material, said tape being of relatively narrow width, as from 5 to 8 inches, according to the width of tire 6 used on the traction wheel 7, and being of any desired suitable length, as from 10 to 40 yards. While said tape may be wound upon a reel or roller 8, as shown in Fig. 6, it is preferably folded within the box or carton 4 in even flat layers, as shown in Fig. 4, having its upper or free end passed outward through a suitably located slot 9 in the carton top or cover, thence over a transversely disposed rod 10 which is located in a stationary position within the front end of the casing 1 near the top of the latter, and thence rearward to a point adjacent to a slot 11 provided in the rear end of said casing, said slot 11 being preferably maintained normally closed by a depending hinged cover or flap 12. Attached to the said free end of the tape is a pair of strong thongs or cords 13 which are adapted, when occasion requires, to be drawn out and attached to the wheel 7, as shown in Fig. 5. When said cords are so attached to the wheel, traction movement of the latter will carry the tape beneath the wheel, as shown in Fig. 1, thus removing said wheel from contact with the ground and affording a dry surface which will offer sufficient frictional resistance to prevent the ineffective spinning of said wheel and to enable the latter to climb thereon from its non-effectual working position in a mud-hole. In other words, the turning of the traction wheel acts to unwind and spread the tape in the path of said wheel presenting a dry harsh surface whereon frictional resistance to the free turning of the wheel is encountered, resulting in the utilization of the traction force exerted.

As is obvious, the casing 1 is readily applicable to vehicles already in use, and may either be mounted permanently in place on the running board, or may be carried in the car and attached when occasion requires.

The cover 3 is preferably attached to the running board 2 by means of bolts or screws 14, as shown in Fig. 4. Strap-like keepers 15 provided on the under side of said cover adjacent its inner edge are adapted to receive outwardly directed tongues 16 carried by the side of the casing, and bolts or screws 17 are adapted to be directed through said cover and an underlying flange 18 carried by the casing at the side opposite said tongues. Thus, to remove the casing, as when it is desired to refill the latter, or to insert a filled carton, it is only necessary to remove said bolts or screws 17 and to slide the casing outward to disengage the tongues 16 from the keepers 15.

As is apparent, when, in building new cars, it is desired to attach a device embodying my invention, the same may be mounted on the under side of the rear fender 19, as shown in the modification illustrated in Fig. 5. In such case the casing is preferably shaped to conform to the curvature of the fender, as shown. Access may be had to the interior of the casing through an opening in the fender which is normally maintained closed in any suitable manner, as by a hinged cover 20.

In Fig. 6 I have shown a casing 1ª in which is mounted a roller 8 upon which the tape is wound and from which it may be unwound with rotation of the wheel in a manner which will be readily understood, said tape being passed through a suitably located slot, as 21.

What is claimed is—

1. An emergency device for motor vehicles, comprising a casing adapted for mounting in a stationary position adjacent to and in front of a traction wheel of such vehicle, a tape suitably disposed within said casing and adapted to have an end attached to said wheel whereby forward rotation of the latter acts to draw said tape outward from said casing and to carry the same beneath said wheel.

2. An emergency device for motor vehicles, comprising a casing adapted for mounting in a stationary position adjacent to and in front of a traction wheel of such vehicle, a tape suitably disposed within said casing and adapted to be drawn lengthwise from said casing, and means for attaching an end of said tape to said wheel, said tape being adapted to be drawn outward from said casing and spread in the path of said wheel by forward rotation of the latter.

3. An emergency device for motor vehicles, comprising a casing adapted for mounting in a stationary position adjacent to and in front of a traction wheel of such vehicle, a tape disposed in lengthwise return layers within said casing, said casing having a slot therein through which an end of said tape may be projected and through which said tape may be withdrawn, and means for attaching said tape to said wheel.

4. An emergency device for motor vehicles, comprising a casing detachably mounted in a stationary position on the vehicle in front of a traction wheel thereof, said casing having an opening in the end thereof adjacent to said wheel, a tape of suitable material disposed in readily lengthwise withdrawable position within said casing and having an end projected outward through said opening, and means for attaching said end to said wheel.

5. An emergency device for motor vehicles, comprising a casing detachably mounted in a stationary position on the vehicle in front of a traction wheel thereof, said casing having an opening in the end thereof adjacent to said wheel, a tape of suitable material disposed within said casing and readily withdrawable therefrom in lengthwise direction, means maintaining said tape flat during its withdrawal, said tape having one end projected outward through said opening, and means for attaching said end to said wheel.

6. An emergency device for motor vehicles, comprising a plate or cover adapted for attachment to the under side of the running board of such vehicle, a casing, means for detachably mounting said casing on the under side of said cover, said casing having an opening therein, a tape of suitable material disposed in readily withdrawable position within said casing and adapted to be withdrawn through said opening, and means for attaching an end of said tape to said wheel.

7. An emergency device for motor vehicles, comprising a casing detachably mounted in a stationary position on the vehicle in front of a traction wheel thereof, said casing having an opening in the end thereof adjacent to said wheel, a carton removably fitted within said casing, a tape of suitable material disposed in superposed return layers within said carton and adapted to be withdrawn through said opening, said tape having an end projecting through said opening in the casing, and means for attaching said end to said wheel.

8. An emergency device for motor vehicles, comprising a casing detachably mounted in a stationary position on the vehicle in front of a traction wheel thereof, said casing having an opening in the end thereof adjacent to said wheel, a carton removably fitted within said casing, a cover for said carton, said cover having a slot therein, a tape of suitable material disposed in superposed return layers within said carton and having an end passed through said slot in the carton cover and projected outward through the opening in the casing, and means for attaching said end to said wheel.

In testimony whereof, I affix my signature in presence of two subscribing witnesses.

PETER F. HABERSTICK.

Witnesses:
W. F. KEIFER,
H. E. DUNLAP.